United States Patent [19]
Weaver

[11] Patent Number: 5,717,513
[45] Date of Patent: Feb. 10, 1998

[54] UNSTICKING MIRROR ELEMENTS OF DIGITAL MICROMIRROR DEVICE

[75] Inventor: Douglas J. Weaver, Dallas, Tex.

[73] Assignee: Texas Instruments Incorporated, Dallas, Tex.

[21] Appl. No.: 370,704

[22] Filed: Jan. 10, 1995

[51] Int. Cl.[6] .......................... G02B 26/08; G02B 5/08; G02B 7/182; G09G 3/34

[52] U.S. Cl. .................. 359/221; 359/224; 359/855; 345/108

[58] Field of Search ..................... 359/855, 221, 359/224, 225, 291, 295, 236, 234; 345/108, 214

[56] References Cited

U.S. PATENT DOCUMENTS

| | | | |
|---|---|---|---|
| 5,061,049 | 10/1991 | Hornbeck | 359/213 |
| 5,096,279 | 3/1992 | Hornbeck et al. | 359/221 |
| 5,289,172 | 2/1994 | Gale, Jr. et al. | 359/291 |
| 5,387,924 | 2/1995 | Gale, Jr. et al. | 359/291 |
| 5,412,186 | 5/1995 | Gale | 359/900 |
| 5,444,566 | 8/1995 | Gale et al. | 359/291 |
| 5,482,564 | 1/1996 | Douglas et al. | 134/37 |
| 5,504,504 | 4/1996 | Markandey et al. | 345/214 |

*Primary Examiner*—Jon W. Henry
*Attorney, Agent, or Firm*—Charles A. Brill; James C. Kesterson; Richard L. Donaldson

[57] ABSTRACT

A method of repositioning mirror elements (10) of a digital micromirror device (DMD) that have become stuck in an "on" or an "off" position. The mirror element (10) is irradiated with a short high-energy pulse of visible light. The method may be easily performed during fabrication at the wafer level, and may be followed by a passivation step to prevent further sticking.

20 Claims, 2 Drawing Sheets

UNSTICKING MIRROR ELEMENTS OF DIGITAL MICROMIRROR DEVICE

TECHNICAL FIELD OF THE INVENTION

This invention relates to digital micro-mirror devices (DMDs), and more particularly to repositioning mirror elements that are stuck in a tilted position.

BACKGROUND OF THE INVENTION

The digital micromirror device (DMD) is a micromechanical device, which may be used as a reflective spatial light modulator. It has an array of rotatable mirrors, fabricated over an address circuit having CMOS memory cells. A typical DMD has mirrors that are 16 micrometers wide on a pitch of 17 micrometers, and that rotate plus or minus 10 degrees from a flat (non-tilted) position.

When a DMD mirror rotates, it touches an underlying landing surface. During manufacture or during operation, mirrors of the DMD may become stuck to this landing surface. The sticking can occur in either direction of the mirror tilt, such that the mirror can be either stuck "off" or stuck "on".

One application of DMDs is image displays, where an array of mirror elements are individually addressed to form images. In such applications, a mirror element that is "off" is always perceived as a black pixel. A mirror element that is stuck "on" is always perceived as a pixel of maximum intensity.

One approach to unsticking mirror elements is described in U.S. Pat. No. 5,418,186, entitled "Elimination of Sticking of Micromechanical Devices". In that patent application, a micromechanical device, such as a DMD, is subjected to microwave radiation at a frequency that causes the radiation to be absorbed by water molecules on the stuck surfaces.

SUMMARY OF THE INVENTION

One aspect of the invention is a method of repairing a digital micromirror device (DMD) having one or more mirror elements in a "stuck" position. Each stuck mirror element is irradiated with a pulse of radiation having a wavelength in the range from ultraviolet to infrared. The pulse duration is approximately 500 nanoseconds or less and has a power of 1 microjoule or less per spot size of approximately 16 micrometers. The radiation may be single-wavelength or wide band, such as white light. The pulse duration and power are selected so as to provide a shock that repositions the stuck mirror element without damaging the DMD.

An advantage of the invention is that it provides a simple and inexpensive means for unsticking mirror elements. Inexpensive light sources may be used and the invention is effective for a range of wavelengths or for white light. The wavelength selection for the radiation to be used is not sensitive to the type of DMD. The method may be performed in conjunction with other techniques directed to avoiding sticking.

DETAILED DESCRIPTION OF THE INVENTION

Figure 1:
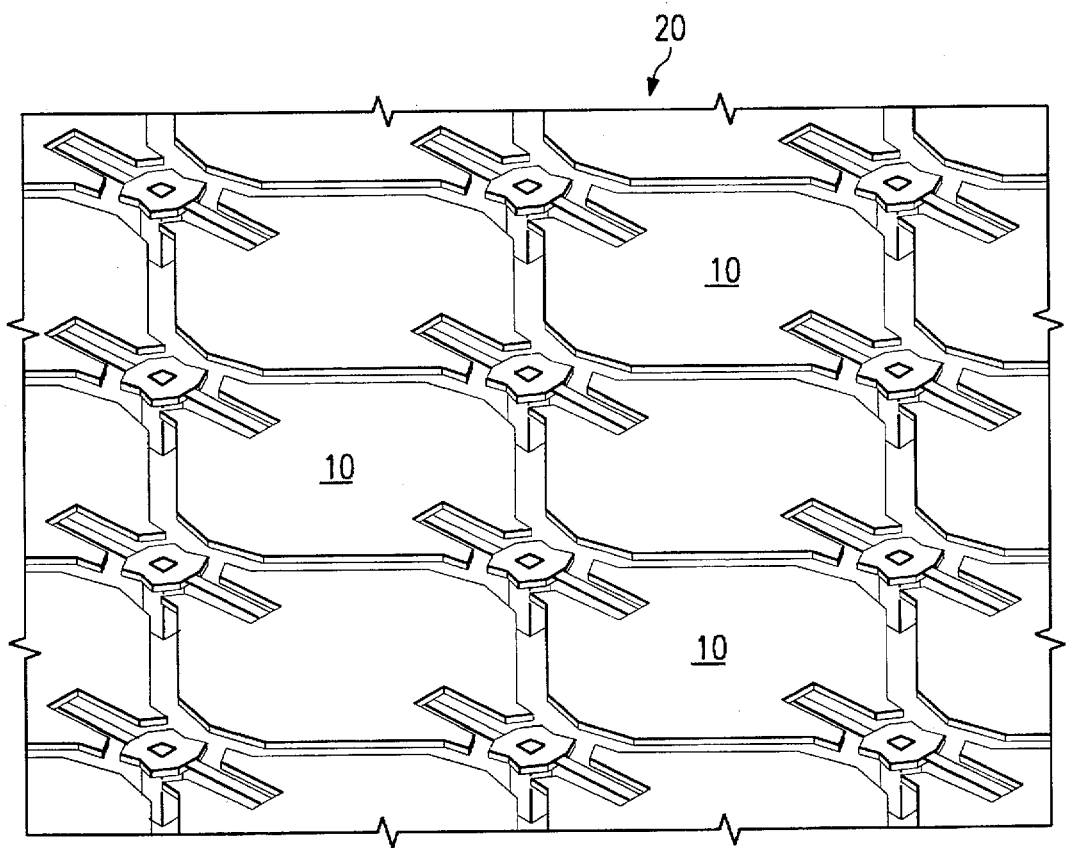
FIG. 1 is a top plan view of a portion of an array of mirror elements, such as are used for a digital micromirror device.

FIG. 1 illustrates a portion of the top surface of an array of mirror elements 10, such as are used for a digital micromirror device (DMD) 10. Each mirror element 10 has a reflective surface, visible in FIG. 1. As explained in the Background, for image display applications, these mirror elements 10 tilt to either an "on" or an "off" position to form images. This invention is directed to unsticking mirror elements 10 that are stuck in either an "on" or an "off" position. The stuck mirror elements are irradiated with a short pulse of light, which "shocks" them into a repositioned state.

Figure 3:
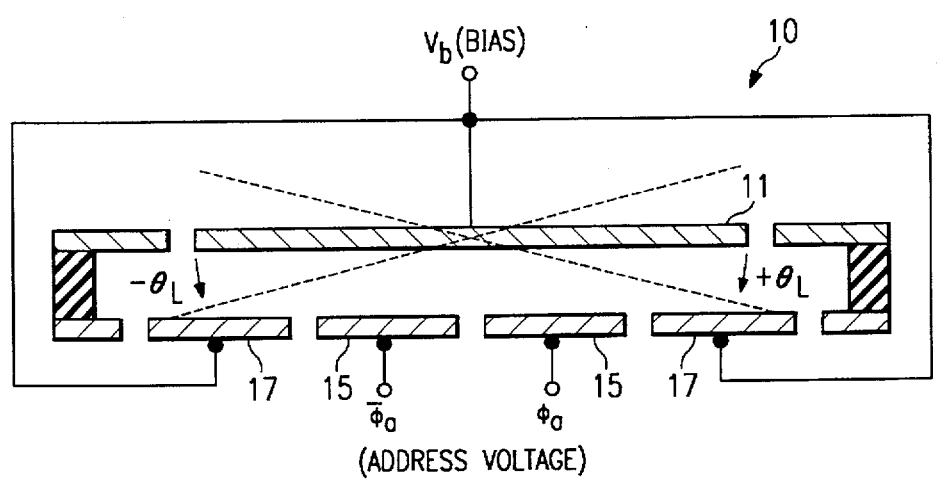
FIG. 3 is a schematic illustration of one of the mirror elements of FIG. 1.
Figure 2:
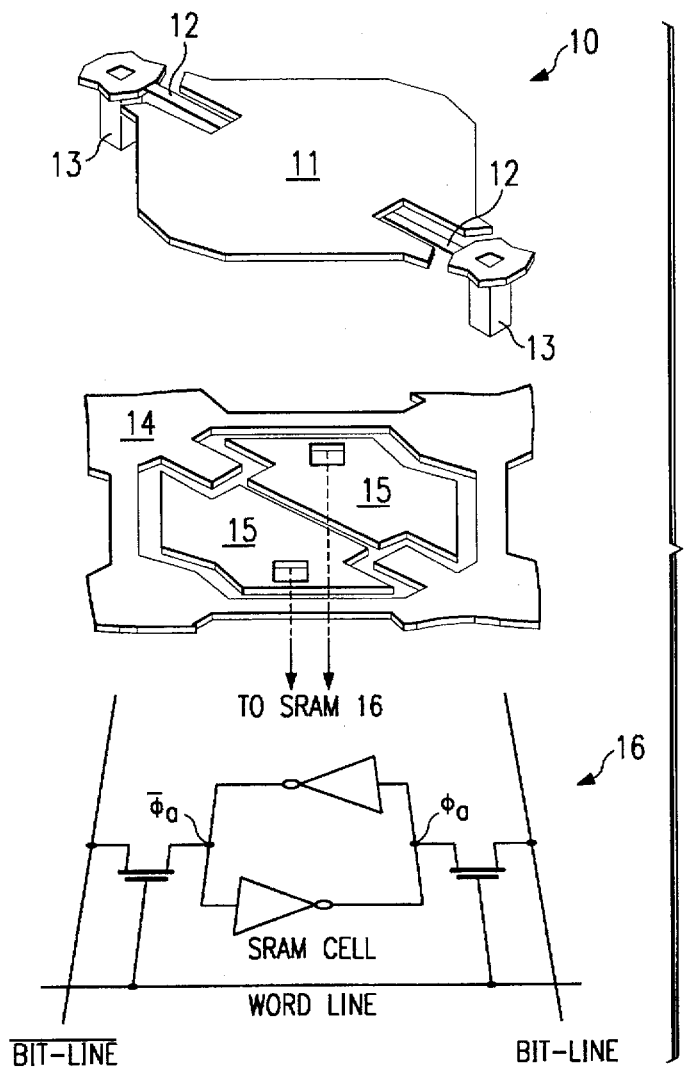
FIG. 2 is an exploded perspective view of one of the mirror elements of FIG. 1.

FIG. 2 is an exploded perspective view of a mirror element 10. FIG. 3 is a schematic cross section of the same mirror element 10. The mirror 11 is suspended over an air gap by two thin mechanically compliant torsion hinges 12. The hinges 12 are supported by posts 13 that are electrically connected to an underlying bias/reset bus 14. This bus 14 interconnects all the mirror elements 10 to a bond pad so that a bias/reset voltage can be applied to the mirrors 11. Underlying the mirrors 11 are a pair of address electrodes 15 that are connected to the complementary sides of an underlying SRAM cell 16. Depending on the state of the SRAM cell 16, the mirror 11 is electrostatically attracted by a combination of bias and address voltage to one of the other of the address electrodes 15. The mirror 11 rotates until its tip touches a landing electrode 17 held at the same potential as the mirror 11. A "1" in the memory cell 16 causes the mirror 11 to rotate +10 degrees. A "0" in the memory cell 16 causes the mirror 11 to rotate −10 degrees.

The mirror element 10 of FIGS. 1–3 is known as a "torsion beam" mirror element. Another type of mirror element is the "hidden hinge" type, whose hinges and hinge support posts are under the mirror. Still other types of mirror elements are cantilever beam types and flexure beam types. Various mirror element types are described in U.S. Pat. No. 4,662,746, entitled "Spatial Light Modulator and Method"; U.S. Pat. No. 4,954,789, entitled "Spatial Light Modulator"; U.S. Pat. No. 4,956,610, entitled "Spatial Light Modulator"; U.S. Pat. No. 5,061,049, entitled "Multi-level Deformable Mirror Device"; and U.S. patent Ser. No. 08/171,303, entitled "Multi-level Digital Micromirror Device". Each of these patents is assigned to Texas Instruments Incorporated, and each is incorporated herein by reference.

Figure 4:
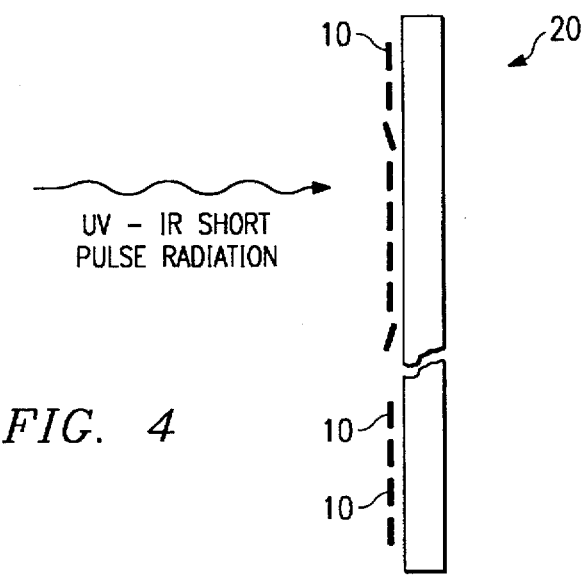
FIG. 4 is a side view of an array of mirror elements, some of which have become stuck.

FIG. 4 is a side view of the DMD array 20 of FIG. 1, in which several mirror elements 10 have become stuck in either an "on" or an "off" position. As stated in the Background, where the DMD is used in an image display systems, these are "white defect" and "black defect" mirror elements, respectively. White defects can be perceptible by the viewer as a bright spot, and black defects can be perceptible as a dark spot.

In one embodiment of the invention, the mirrors are repositioned by irradiating the entire array 20 at once. The irradiation has no effect on mirror elements 10 that are not stuck. Or, array 20 may be irradiated by scanning it in sections.

In another embodiment of the invention, a first step is to determine the location of the defective mirror element(s) 10. This can be accomplished by dividing the surface of the DMD array 20 into two-dimensional coordinates, with each mirror element 10 corresponding to location coordinates.

For example, a mirror element 10 in row x, column y, could be assigned the location coordinates (x,y). Once the location of defective mirror elements 10 is determined, they are individually targeted with a beam of radiation.

A feature of the invention is that within a range of wavelengths from ultraviolet to infrared, any wavelength or combination of wavelengths may be used. Although laser radiation provides precise wavelength, the use of a laser is not necessary to the invention. In fact, broadband white light has provided satisfactory results, such as that provided by a xenon arc source. Furthermore, within the range of wavelengths from ultraviolet to infrared, the repositioning effect is not substantially affected by variations among types of DMD mirror elements.

The duration and power of the radiation are selected so as to result in a shock wave at the interface of mirror 11 and its contacting surface. This "jolts" the mirror from its stuck position.

In general, the radiation is a short high-energy pulse. The optimal pulse duration and power will be affected by the size and material of mirror 11. Another factor is whether the DMD array is packaged and therefore protected by a transparent window through which the radiation must pass. For typical DMDs, the pulse length is 500 nanoseconds or less. A series of short pulses could also be applied.

A torsion beam mirror element 10, such as that illustrated by FIGS. 1-3, has a surface area of approximately 16 microjoules square. This surface area is a "spot size" for purposes of determining the power of the required radiation. For such a spot size, the power will be less than 1 microjoule, with an expected range of between 0.5 and 1.0 microjoules. The power is sufficiently high so as to provide the desired repositioning, but sufficiently low so as to not damage the device.

For a torsion beam mirror element 10, such as illustrated in FIGS. 1-3 and having mirrors 11 made from aluminum, radiation from a single-pulse, frequency doubled ND:YAG laser (wavelength=532 nM) has been experimentally determined to provide satisfactory results. At this wavelength, a suitable pulse duration is 5 nanoseconds at 1 microjoule of power.

A characteristic of DMD manufacture is that a number of die, each for a separate DMD device, can be manufactured as a wafer, using integrated circuit manufacturing techniques. Sometimes sticking occurs during an "undercut" process, in which a sacrificial layer under the mirrors 11 is removed to form the air gaps between the mirrors and their address circuitry. Undercutting is often followed by a "passivation" process, which is directed to preventing sticking during DMD operation, by techniques such as applying lubricants, drying, or cleaning. Examples of a wafer-level passivation technique are described in U.S. Pat. No. 5,512,374, entitled "PFPE Coatings for Micromechanical Devices", and in U.S. Pat. No. 5,331,454, entitled "Low Reset Voltage Process for DMD", each assigned to Texas Instruments Incorporated, and incorporated herein by reference.

If the method of the invention is performed during manufacture, it may be performed after the undercutting and before breaking the wafer into die. Thus, after undercutting, the wafer can be tested for stuck mirrors. If mirrors are stuck, repositioning in accordance with the invention can be performed by locating individual defective pixels or by irradiating all or part of the wafer at once. The repositioning can be followed by repeating any previously performed passivation steps. This allows for the fact that if mirrors were stuck after the undercutting, the first passivation step was not effective as to those mirror elements.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of repositioning mirror elements of a digital micromirror device (DMD) having one or more mirror elements in a "stuck" position, comprising the steps of:

irradiating each stuck mirror element with one pulse of radiation having a wavelength in the range from ultraviolet to infrared;

wherein the pulse duration and the power of said pulse of radiation are selected so as to provide a shock wave sufficient to reposition said stuck mirror element without damage to said DMD.

2. The method of claim 1, wherein said irradiating step is performed with radiation of a single wavelength.

3. The method of claim 1, wherein said irradiating step is performed with radiation of a predetermined range of wavelengths.

4. The method of claim 1, further comprising the step of detecting the location of each mirror element that is stuck, and wherein said irradiating step is performed selectively with respect to said location.

5. The method of claim 1, wherein said irradiating step is performed by irradiating all mirror elements of said DMD at the same time.

6. The method of claim 1, wherein said irradiating step is performed by scanning said DMD.

7. The method of claim 1, wherein said pulse of radiation has a duration of approximately 500 nanoseconds or less.

8. The method of claim 1, wherein said pulse of radiation has a power of 1 microjoule or less per spot size of approximately 256 square micrometers.

9. The method of claim 1, wherein said mirror elements have a size of approximately 16 micrometers square and wherein said pulse duration is approximately 5 nanoseconds.

10. The method of claim 1, wherein said mirror elements are larger than 16 micrometers square and wherein said power is between 0.5 and 1.0 microjoule per 256 square micrometers.

11. A method of repositioning stuck mirror elements in a wafer of digital micromirror devices, comprising the steps of:

irradiating each stuck mirror element on said wafer with one pulse of radiation having a wavelength in the range from ultraviolet to infrared, said pulse of radiation having a predetermined pulse duration and power so as to provide a shock wave sufficient to reposition said stuck mirror element without damage to said digital micromirror devices; and performing a wafer level passivation step on said mirror elements.

12. The method of claim 11, wherein said irradiating step is performed with radiation of a single wavelength.

13. The method of claim 11, wherein said irradiating step is performed with radiation of a range of wavelengths.

14. The method of claim 11, further comprising the step of detecting the location of each mirror element that is stuck, and wherein said irradiating step is performed selectively with respect to said location.

15. The method of claim 11, wherein said irradiating step is performed by irradiating all mirror elements of said wafer at the same time.

16. The method of claim 11, wherein said irradiating step is performed by scanning said wafer.

17. The method of claim 11, wherein said pulse of radiation has a duration of approximately 500 nanoseconds or less.

18. The method of claim 11, wherein said pulse of radiation has a power of 1 microjoule or less per spot size of approximately 256 square micrometers.

19. The method of claim 11, said irradiating step comprising irradiating each stuck mirror element with a series of short pulses.

20. The method of claim 1, said irradiating step comprising irradiating each stuck mirror element with a series of short pulses.

* * * * *